(12) United States Patent
Lim (10) Patent No.: US 12,202,326 B2
(45) Date of Patent: Jan. 21, 2025

(54) VEHICLE BATTERY PACK MOUNTING STRUCTURE

(71) Applicants: HYUNDAI MOTOR COMPANY, Seoul (KR); KIA CORPORATION, Seoul (KR)

(72) Inventor: Jun Young Lim, Incheon (KR)

(73) Assignees: HYUNDAI MOTOR COMPANY, Seoul (KR); KIA CORPORATION, Seoul (KR)

(*) Notice: Subject to any disclaimer, the term of this patent is extended or adjusted under 35 U.S.C. 154(b) by 302 days.

(21) Appl. No.: 17/875,056

(22) Filed: Jul. 27, 2022

(65) Prior Publication Data

US 2023/0182557 A1    Jun. 15, 2023

(30) Foreign Application Priority Data

Dec. 15, 2021   (KR) .................. 10-2021-0179795

(51) Int. Cl.
*B60K 1/04*     (2019.01)
*B60L 50/60*    (2019.01)
(Continued)

(52) U.S. Cl.
CPC ............... *B60K 1/04* (2013.01); *B60L 50/66* (2019.02); *H01M 50/24* (2021.01);
(Continued)

(58) Field of Classification Search
CPC ..... B60L 50/66; H01M 50/24; H01M 50/249; H01M 50/264; H01M 2220/20
See application file for complete search history.

(56) References Cited

U.S. PATENT DOCUMENTS 9,227,582 B2 * 1/2016 Katayama ............. H01M 50/24
10,639,981 B2   5/2020 Kasai et al.
(Continued)

FOREIGN PATENT DOCUMENTS

JP    2005199918 A    7/2005
JP    2017226353 A   12/2017
(Continued)

*Primary Examiner* — Jason D Shanske
*Assistant Examiner* — James J Triggs
(74) *Attorney, Agent, or Firm* — Lempia Summerfield Katz LLC (57) ABSTRACT

A vehicle battery pack mounting structure includes: a coupling bolt coupled to a vehicle body through a battery pack; a mounting bushing accommodating the coupling bolt therein and coupled to the battery pack; a lower fixation nut fixing a lower portion of the mounting bushing to the lower casing; an upper fixation nut fixing an upper portion of the mounting bushing to the upper cover; and a lower sealing member. The lower sealing member is configured to seal between the mounting bushing and the lower casing in response to fastening of the lower fixation nut. In addition, the vehicle battery pack mounting structure further includes an upper sealing member configured to seal between the mounting bushing and the upper cover in response to fastening of the upper fixation nut. The vehicle battery pack mounting structure also includes a vehicle body side sealing member sealing between the upper fixation nut and the vehicle body in response to the fastening of the coupling bolt.

10 Claims, 4 Drawing Sheets

(51) Int. Cl.
*H01M 50/24* (2021.01)
*H01M 50/249* (2021.01)
*H01M 50/264* (2021.01)

(52) U.S. Cl.
CPC ....... *H01M 50/249* (2021.01); *H01M 50/264* (2021.01); *B60K 2001/0438* (2013.01); *H01M 2220/20* (2013.01)

(56) References Cited

U.S. PATENT DOCUMENTS

| | | | |
|---|---|---|---|
| 11,038,236 B2 * | 6/2021 | Montgomery | H01M 50/244 |
| 2014/0326524 A1 * | 11/2014 | Ogushi | H01M 50/244 |
| | | | 180/68.5 |
| 2019/0275873 A1 | 9/2019 | Kasai et al. | |
| 2020/0231222 A1 | 7/2020 | Ahn et al. | |
| 2020/0269933 A1 | 8/2020 | Ryu | |

FOREIGN PATENT DOCUMENTS

| | | | |
|---|---|---|---|
| JP | 2019155965 A | | 9/2019 |
| KR | 20180097802 A | | 9/2018 |
| KR | 20210001334 A | | 1/2021 |
| KR | 20210070790 A | | 6/2021 |
| KR | 20220168901 A | | 12/2022 |

\* cited by examiner

VEHICLE BATTERY PACK MOUNTING STRUCTURE

CROSS-REFERENCE TO RELATED APPLICATION

The present application claims priority to Korean Patent Application No. 10-2021-0179795, filed Dec. 15, 2021, the entire contents of which are incorporated herein for all purposes by this reference.

BACKGROUND

Technical Field

The present disclosure relates generally to a vehicle battery pack mounting structure.

Description of the Related Art

A battery pack is mounted to an electric vehicle to supply power required to drive the vehicle. The battery pack accommodates a plurality of battery modules, and each of the battery modules includes a plurality of battery cells.

In many cases, the battery pack is mounted to a lower portion of a vehicle body. In this case, the battery pack may be firmly mounted to the vehicle body. In addition, the battery pack requires a sealing function to prevent moisture or foreign matter from leaking into the battery pack.

Specifically, a vehicle may receive an unexpected impact from the outside environment. Therefore, it may be advantageous that the battery pack maintains the stable sealing function even when an external impact occurs.

The foregoing described as the controller, and the controlling method of operating a fuel cell is intended merely to aid in understanding the background of the present disclosure. It is not intended to mean that the present disclosure falls within the purview of the related art that is already known to those having ordinary skill in the art.

SUMMARY

Accordingly, the present disclosure has been made keeping in mind the above problem occurring in the related art. The present disclosure is intended to provide a vehicle battery pack mounting structure. The vehicle battery pack mounting structure is configured to have a battery pack firmly mounted to a lower portion of a vehicle body and to stably maintain a sealing function. The sealing function prevents moisture or foreign matter from leaking into the battery pack even when an external impact occurs, thereby improving the durability and stability of the battery pack.

In order to achieve the above object, according to one aspect of the present disclosure, a vehicle battery pack mounting structure is provided. The vehicle battery pack mounting structure includes a coupling bolt coupled to a vehicle body by penetrating through a battery pack, and a mounting bushing accommodating the coupling bolt therein and penetrating through and coupled to the battery pack. Further, even when a fastening force is applied to the coupling bolt, the mounting bushing is configured to maintain a constant interval between a lower casing and an upper cover of the battery pack. In addition, the vehicle battery pack mounting structure includes: a lower fixation nut fixing a lower portion of the mounting bushing to the lower casing; an upper fixation nut fixing an upper portion of the mounting bushing to the upper cover; a lower sealing member configured to seal between the mounting bushing and the lower casing as the lower fixation nut is fastened to the mounting bushing; an upper sealing member configured to seal between the mounting bushing and the upper cover as the upper fixation nut is fastened to the mounting bushing; and a vehicle body side sealing member. The vehicle body side sealing member is configured to seal between the upper fixation nut and the vehicle body as the coupling bolt is fastened to the vehicle body.

The mounting bushing may include a column part located between the lower casing and the upper cover, and shaped in a hollow cylinder perpendicular to the lower casing and the upper cover. The mounting bushing may further include a lower fixation part extending downward from a lower end of the column part and penetrating through the lower casing, and to which the lower fixation nut may be fastened. The mounting bushing may also include an upper fixation part extending upward from an upper end of the column part and penetrating through the upper cover, and to which the upper fixation nut may be fastened.

The mounting bushing may include a flange part extending radially outward from the lower end of the column part. The flange part may be in surface-contact with an upper surface of the lower casing at a location opposite to the lower fixation nut, such that the lower casing is located between the lower fixation nut and the flange part. Further, when the lower fixation nut is fastened to the lower fixation part, the flange part and the lower fixation nut may compress the lower casing at opposite sides.

The lower sealing member may be mounted to the flange part of the mounting bushing. The lower sealing member may be compressed between the flange part and the lower casing as the lower fixation nut is fastened to the lower fixation part.

The lower fixation part of the mounting bushing may have a diameter larger than an inner diameter of the column part. In this way, the lower fixation part may accommodate a head part of the coupling bolt therein.

The upper fixation part of the mounting bushing may have an outer diameter smaller than an outer diameter of the column part. Thus, the upper fixation nut and the upper end of the column part may overlap each other, with the upper cover located between the upper fixation nut and the column part.

The upper sealing member may be mounted to the upper end of the column part of the mounting bushing, and the upper sealing member may be compressed between the column part and the upper cover as the upper fixation nut is fastened to the upper fixation part.

The vehicle body side sealing member may be mounted on an upper surface of the upper fixation nut. Thus, when the coupling bolt is fastened to a weld nut provided in the vehicle body, the vehicle body side sealing member may be compressed between the vehicle body and the upper fixation nut.

In order to achieve the above objects, according to one aspect of the present disclosure, there is provided a vehicle battery pack mounting structure including a mounting bushing configured to support an interval between a lower casing of a battery pack and an upper cover. The vehicle battery pack mounting structure also includes a coupling bolt configured to fix the battery pack to a vehicle body, and coupled to the vehicle body through the mounting bushing so as to generate a pressure to seal between the mounting bushing and the vehicle body. Further, the vehicle battery pack mounting structure includes a lower fixation nut fastened to a lower fixation part of the mounting bushing. The lower fixation part protrudes downward through the lower casing to generate a pressure to create a seal between the mounting bushing and the lower casing. The vehicle battery pack mounting structure also includes an upper fixation nut fastened to an upper fixation part of the mounting bushing. The upper fixation part protrudes upward through the upper cover to generate a pressure to create a seal between the mounting bushing and the upper cover.

The vehicle battery pack mounting structure may include a lower sealing member disposed between the mounting bushing and the lower casing. The lower sealing member may be configured to be deformed by the pressure generated by the lower fixation nut and to provide a sealing function. The vehicle battery pack mounting structure may further include an upper sealing member disposed between the mounting bushing and the upper cover. The upper sealing member may be configured to be deformed by the pressure generated by the upper fixation nut and to provide the sealing function. The vehicle battery pack mounting structure may also include a vehicle body side sealing member disposed between the upper fixation nut and the vehicle body. The vehicle body side sealing member may be configured to be deformed by the pressure generated by the coupling bolt and to provide the sealing function.

The mounting bushing may include: a column part located between the lower casing and the upper cover; the lower fixation part protruding downward from the column part; and the upper fixation part protruding upward from the column part.

The mounting bushing may include a flange part radially protruding from a lower portion of the column part to support an upper surface of the lower casing. The lower fixation part may be configured to accommodate a head part of the coupling bolt therein.

The lower sealing member may be disposed between the flange part of the mounting bushing and the lower casing. The upper sealing member may be disposed between an upper end of the column part of the mounting bushing and the upper cover.

The vehicle battery pack mounting structure of the present disclosure is configured to have the battery pack firmly mounted to a lower portion of the vehicle body. The vehicle battery pack mounting structure is further configured to stably maintain the sealing function, preventing moisture or foreign matter from leaking into the battery pack even when an external impact occurs. Thus, the durability and stability of the battery pack may be significantly improved.

BRIEF DESCRIPTION OF THE DRAWINGS

The above and other objects, features, and other advantages of the present disclosure should be more clearly understood from the following detailed description when taken in conjunction with the accompanying drawings, in which.

DETAILED DESCRIPTION

In the following description, the structural or functional description specified to embodiments according to the concept of the present disclosure is intended to describe the disclosed embodiments. Thus, it should be understood that the present disclosure may be variously embodied, without being limited to the disclosed embodiments.

Embodiments described herein may be changed in various ways and various shapes, so specific embodiments are shown in the drawings and are described in detail in this specification. However, it should be understood that the embodiments according to the concept of the present disclosure are not limited to the embodiments which are described herein below with reference to the accompanying drawings, but all of modifications, equivalents, and substitutions are included in the scope and spirit of the disclosure.

It should be understood that, although the terms first and/or second, and the like may be used herein to describe various elements, these elements should not be limited by these terms. These terms are only used to distinguish one element from another element. For instance, a first element discussed below could be termed a second element without departing from the teachings of the present disclosure. Similarly, the second element could also be termed the first element.

It is to be understood that when one element is referred to as being "connected to" or "coupled to" another element, it may be connected directly to or coupled directly to another element or be connected to or coupled to another element, having the other element intervening therebetween. In addition, it is to be understood that when one element is referred to as being "connected directly to" or "coupled directly to" another element, it may be connected to or coupled to another element without the other element intervening therebetween. Further, the terms used herein to describe a relationship between elements, i.e., "between," "directly between," "adjacent," or "directly adjacent," should be interpreted in the same manner as those described above.

The terminology used herein is for the purpose of describing particular embodiments only and is not intended to limit the present disclosure. Singular forms are intended to include plural forms unless the context clearly indicates otherwise. It should be further understood that the terms "comprises" or "have" used in this specification, specify the presence of stated features, steps, operations, components, parts, or a combination thereof, but do not preclude the presence or addition of one or more other features, numerals, steps, operations, components, parts, or a combination thereof.

Unless otherwise defined, all terms including technical and scientific terms used herein have the same meaning as commonly understood by those having ordinary skill in the art to which the present disclosure belongs. It may be understood that the terms defined by the dictionary are identical with the meanings within the context of the related art, and they should not be ideally or excessively formally defined unless the context clearly dictates otherwise.

Hereinbelow, embodiments are described in detail with reference to the accompanying drawings. Like reference numerals given in the drawings indicate like components.

Referring to FIGS. 1 to 4, according to an embodiment of the present disclosure, a vehicle battery pack mounting structure includes a coupling bolt 5 coupled to a vehicle body 3 by penetrating through a battery pack 1. The vehicle battery pack mounting structure further includes a mounting bushing 11 accommodating the coupling bolt 5 therein and penetrating through and coupled to the battery pack 1. Further, even when a fastening force is applied to the coupling bolt 5, the mounting bushing 11 maintains a constant interval between a lower casing 7 and an upper cover 9 of the battery pack 1. The vehicle battery pack mounting structure also includes: a lower fixation nut 13 fixing a lower portion of the mounting bushing 11 to the lower casing 7; an upper fixation nut 15 fixing an upper portion of the mounting bushing 11 to the upper cover 9; and a lower sealing member 17. The lower sealing member 17 is configured to seal between the mounting bushing 11 and the lower casing 7 as the lower fixation nut 13 is fastened to the mounting bushing 11. Furthermore, the vehicle battery pack mounting structure includes an upper sealing member 19 configured to seal between the mounting bushing 11 and the upper cover 9 as the upper fixation nut 15 is fastened to the mounting bushing 11. The vehicle battery pack mounting structure also includes a vehicle body side sealing member 21. The vehicle body side sealing member 21 is configured to seal between the upper fixation nut 15 and the vehicle body 3 as the coupling bolt 5 is fastened to the vehicle body 3.

In other words, the vehicle battery pack mounting structure of the present disclosure is configured such that the battery pack 1 is fixed to a lower portion of the vehicle body 3 by the coupling bolt 5 penetrating through the inside space of the mounting bushing 11 and fixed to the vehicle body 3. Furthermore, the sealing of portions where both the mounting bushing 11 and the coupling bolt 5 penetrate through the battery pack 1 is implemented by: the lower sealing member 17 and the lower fixation nut 13; the upper sealing member 19 and the upper fixation nut 15; and the vehicle body side sealing member 21 and the coupling bolt 5, thereby excluding the implementation of the sealing function achieved by welding.

Therefore, according to the present disclosure, a damage to a weld portion of the mounting bushing 11, the lower casing 7, or the upper cover 9 by an impact applied to the vehicle body 3 or the battery pack 1 may be prevented. In addition, a loss of the sealing function of the battery pack 1 may be prevented, and the durability of the battery pack 1 may be improved.

Furthermore, according to the present disclosure, even when an impact damages a portion relating to the mounting bushing 11, only the mounting bushing 11, the lower fixation nut 13, and the upper fixation nut 15 may be easily replaced without replacement of the entire battery pack 1. Therefore, inexpensive and easy maintenance may be secured.

Furthermore, as described above, the mounting bushing 11 is coupled to the lower casing 7 and the upper cover 9 by the lower fixation nut 13 and the upper fixation nut 15. Therefore, the mounting bushing 11 has the freedom to be made of a different material from the lower casing 7 or the upper cover 9, unlike a case where the mounting bushing 11, the lower casing 7, and the upper cover 9 are coupled to each other by welding.

Figure 2:
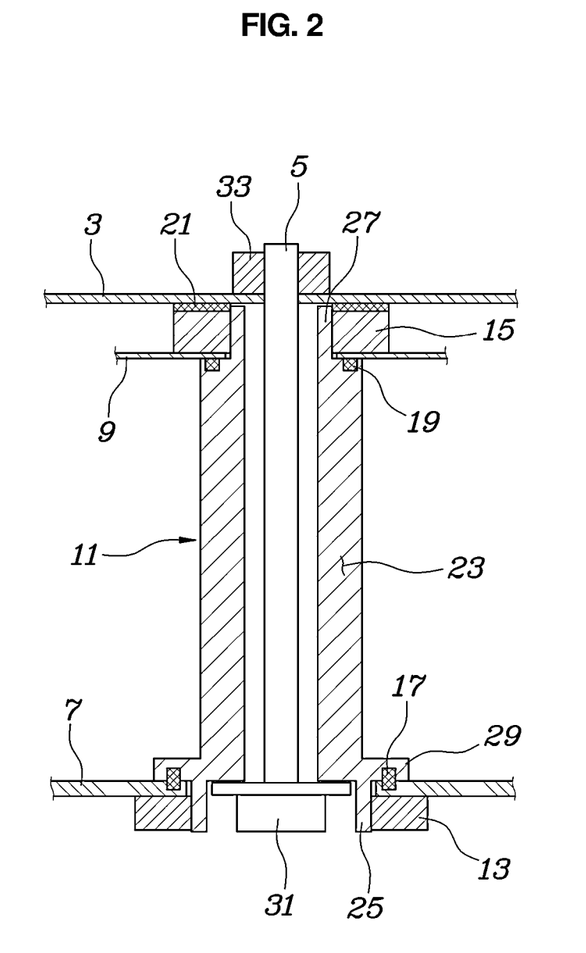
FIG. 2 is a sectional view taken along line in FIG. 1.
Figure 3:
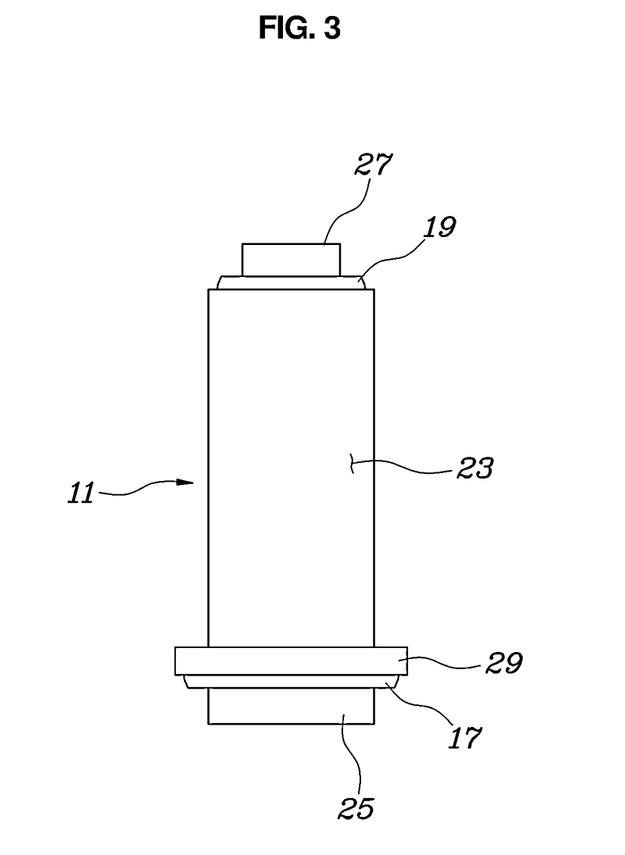
FIG. 3 is a view showing a state wherein an upper sealing member and a lower sealing member are respectively coupled to an upper portion and a lower portion of a mounting bushing.

The mounting bushing 11 is located between the lower casing 7 and the upper cover 9. The mounting bushing 11 includes a column part 23 shaped in, or as, a hollow cylinder perpendicular to the lower casing 7 and the upper cover. The mounting bushing 11 further includes a lower fixation part 25 extending downward from a lower end of the column part 23 and penetrating through the lower casing 7, to which the lower fixation nut 13 is fastened. The mounting bushing 11 also includes an upper fixation part 27 extending upward from an upper end of the column part 23 and penetrating through the upper cover 9, to which the upper fixation nut 15 is fastened.

In other words, the column part 23 supports an interval between the lower casing 7 and the upper cover 9. The lower fixation part 25 protrudes toward the lower side of the lower casing 7. The upper fixation part 27 protrudes toward the upper side of the upper cover 9.

The mounting bushing 11 includes a flange part 29. The flange part 29 extends radially outward from the lower end of the column part 23. The flange part 29 is in surface-contact with an upper surface of the lower casing 7 at a location opposite to the lower fixation nut 13, such that the lower casing 7 is located between the lower fixation nut 13 and the flange part 29. When the lower fixation nut 13 is fastened to the lower fixation part 25, the flange part 29 and the lower fixation nut 13 compress the lower casing 7 at opposite sides.

Furthermore, the lower sealing member 17 is mounted to the flange part 29 of the mounting bushing 11 to be compressed between the flange part 29 and the lower casing 7 as the lower fixation nut 13 is fastened to the lower fixation part 25.

Therefore, sealing between the mounting bushing 11 and the lower casing 7 is achieved by the lower sealing member 17.

The lower fixation part 25 of the mounting bushing 11 has a diameter larger than an inner diameter of the column part 23, so that a head part 31 of the coupling bolt 5 is accommodated in the lower fixation part 25.

Therefore, the lower fixation part 25 may efficiently protect the coupling bolt 5 from an external impact.

An outer diameter of the upper fixation part 27 of the mounting bushing 11 is formed (e.g., configured to be) smaller than an outer diameter of the column part 23, so that the upper fixation nut 15 and the upper end of the column part 23 overlap each other with the upper cover 9 located between the upper fixation nut 15 and the upper end of the column part 23.

The upper sealing member 19 is mounted to the upper end of the column part 23 of the mounting bushing 11 to be compressed between the column part 23 and the upper cover 9 as the upper fixation nut 15 is fastened to the upper fixation part 27.

Therefore, sealing between the mounting bushing 11 and the upper cover 9 is achieved by the upper sealing member 19.

Figure 4:
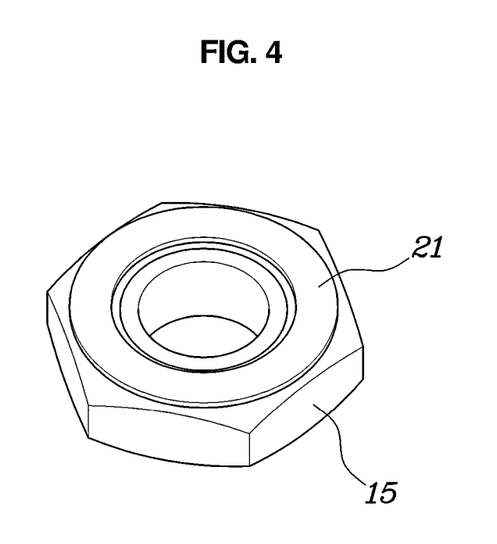
FIG. 4 is a view showing a vehicle body side sealing member located on an upper portion of an upper fixation nut.

The vehicle body side sealing member 21 is mounted to an upper surface of the upper fixation nut 15. When the coupling bolt 5 is fastened to a weld nut 33 provided on the vehicle body 3, the vehicle body side sealing member 21 is compressed between the vehicle body 3 and the upper fixation nut 15.

Therefore, sealing between the vehicle body 3 and the mounting bushing 11 is achieved by the vehicle body side sealing member 21.

Figure 1:
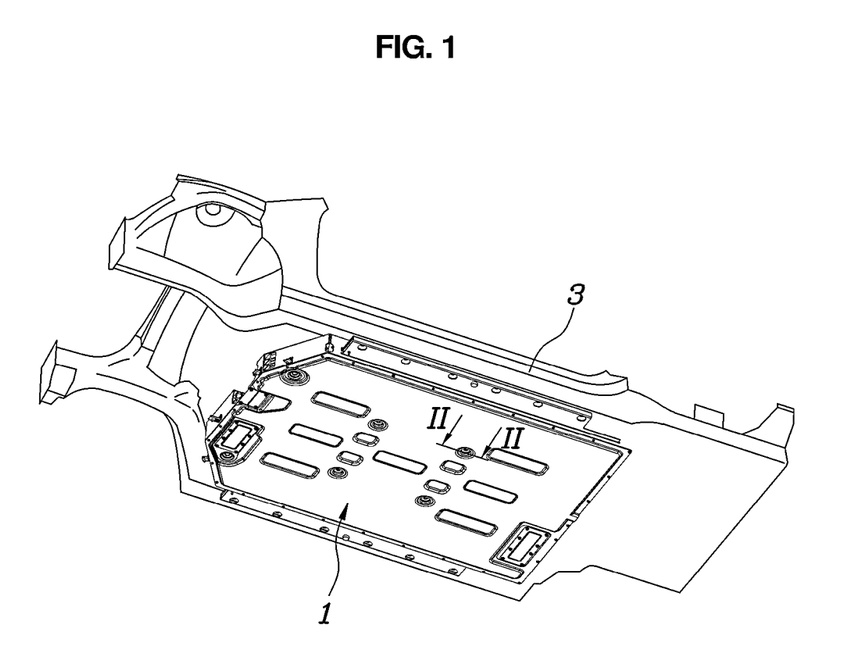
FIG. 1 is a view showing a state where a battery pack is mounted to a vehicle body according to the present disclosure.

As described above, according to the present disclosure, the mounting bushing 11 is mounted to the battery pack 1 by the lower fixation nut 13 and the upper fixation nut 15. The battery pack 1 is mounted to the vehicle body 3 by the coupling bolt 5 fastened to the vehicle body 3 through the mounting bushing 11. Further, the lower fixation nut 13, the upper fixation nut 15, and the coupling bolt 5 are fastened to each other to achieve sealing between the mounting bushing 11 and the battery pack 1. In addition, sealing between the mounting bushing 11 and the vehicle body 3 is achieved together, so that a weak (e.g., insufficient) weld part from an impact does not occur, thereby improving the durability of the battery pack 1 and allowing easy and inexpensive maintenance.

The present disclosure, as described above, may be implemented as follows.

In other words, the vehicle battery pack mounting structure of the present disclosure includes the mounting bushing 11 provided to support an interval between the lower casing 7 of the battery pack 1 and the upper cover 9. The vehicle battery pack mounting structure also includes the coupling bolt 5 fixing the battery pack 1 to the vehicle body 3, and coupled to the vehicle body 3 through the mounting bushing 11 so as to generate a pressure to seal between the mounting bushing 11 and the vehicle body 3. The vehicle battery pack mounting structure further includes the lower fixation nut 13 fastened to the lower fixation part 25 of the mounting bushing 11 protruding downward through the lower casing 7 so as to generate a pressure to seal between the mounting bushing 11 and the lower casing 7. Furthermore, the vehicle battery pack mounting structure includes the upper fixation nut 15 fastened to the upper fixation part 27 of the mounting bushing 11 protruding upward through the upper cover 9 so as to generate a pressure to seal between the mounting bushing 11 and the upper cover 9.

Furthermore, the vehicle battery pack mounting structure of the present disclosure may include the lower sealing member 17 disposed between the mounting bushing 11 and the lower casing 7 so as to be deformed by the pressure generated by the lower fixation nut 13 and to provide the sealing function. The vehicle battery pack mounting structure also includes the upper sealing member 19 disposed between the mounting bushing 11 and the upper cover so as to be deformed by the pressure generated by the upper fixation nut 15 and to provide the sealing function. The vehicle battery pack mounting structure further includes the vehicle body side sealing member 21 disposed between the upper fixation nut 15 and the vehicle body 3 so as to be deformed by the pressure generated by the coupling bolt 5 and to provide the sealing function.

The mounting bushing 11 may include: the column part 23 located between the lower casing 7 and the upper cover; the lower fixation part 25 protruding downward from the column part 23; and the upper fixation part 27 protruding upward from the column part 23.

The mounting bushing 11 may include the flange part 29. The flange part 29 may protrude radially at the lower portion of the column part 23 of the mounting bushing 11 to support the upper surface of the lower casing 7. The lower fixation part 25 may be formed to accommodate the head part 31 of the coupling bolt 5 therein.

The lower sealing member 17 may be disposed between the flange part 29 of the mounting bushing 11 and the lower casing 7. The upper sealing member 19 may be disposed between the upper end of the column part 23 of the mounting bushing 11 and the upper cover 9.

Although the embodiments of the present disclosure have been described for illustrative purposes, those having ordinary skill in the art should appreciate that various modifications, additions, and substitutions are possible, without departing from the scope and spirit of the disclosure as disclosed in the accompanying claims.

What is claimed is:

1. A vehicle battery pack mounting structure comprising:
   a coupling bolt coupled to a vehicle body by penetrating through a battery pack;
   a mounting bushing accommodating the coupling bolt therein and penetrating through and coupled to the battery pack, such that, when a fastening force is applied to the coupling bolt, the mounting bushing is configured to maintain a constant interval between a lower casing and an upper cover of the battery pack;
   a lower fixation nut fixing a lower portion of the mounting bushing to the lower casing;
   an upper fixation nut fixing an upper portion of the mounting bushing to the upper cover;
   a lower sealing member configured to seal between the mounting bushing and the lower casing as the lower fixation nut is fastened to the mounting bushing;
   an upper sealing member configured to seal between the mounting bushing and the upper cover as the upper fixation nut is fastened to the mounting bushing; and
   a vehicle body side sealing member configured to seal between the upper fixation nut and the vehicle body as the coupling bolt is fastened to the vehicle body,
   wherein the mounting bushing includes
      a column part located between the lower casing and the upper cover, and shaped in a hollow cylinder perpendicular to the lower casing and the upper cover,
      a lower fixation part extending downward from a lower end of the column part and penetrating through the lower casing, and to which the lower fixation nut is fastened,
      an upper fixation part extending upward from an upper end of the column part and penetrating through the upper cover, and to which the upper fixation nut is fastened, and
      a flange part extending radially outward from the lower end of the column part, and being in surface-contact with an upper surface of the lower casing at a location opposite to the lower fixation nut, such that the lower casing is located between the lower fixation nut and the flange part,
   wherein, when the lower fixation nut is fastened to the lower fixation part, the flange part and the lower fixation nut compress the lower casing at opposite sides.

2. The vehicle battery pack mounting structure of claim 1, wherein the lower sealing member is mounted to the flange part of the mounting bushing, and the lower sealing member is compressed between the flange part and the lower casing as the lower fixation nut is fastened to the lower fixation part.

3. The vehicle battery pack mounting structure of claim 1, wherein the lower fixation part of the mounting bushing has a diameter larger than an inner diameter of the column part, so that the lower fixation part accommodates a head part of the coupling bolt therein.

4. The vehicle battery pack mounting structure of claim 1, wherein the upper fixation part of the mounting bushing has an outer diameter smaller than an outer diameter of the column part, so that the upper fixation nut and the upper end of the column part overlap each other with the upper cover located between the upper fixation nut and the column part.

5. The vehicle battery pack mounting structure of claim 4, wherein the upper sealing member is mounted to the upper end of the column part of the mounting bushing and the upper sealing member is compressed between the column part and the upper cover as the upper fixation nut is fastened to the upper fixation part.

6. A vehicle battery pack mounting structure comprising:
   a coupling bolt coupled to a vehicle body by penetrating through a battery pack;
   a mounting bushing accommodating the coupling bolt therein and penetrating through and coupled to the battery pack, such that when, a fastening force is applied to the coupling bolt, the mounting bushing is configured to maintain a constant interval between a lower casing and an upper cover of the battery pack;

a lower fixation nut fixing a lower portion of the mounting bushing to the lower casing;

an upper fixation nut fixing an upper portion of the mounting bushing to the upper cover;

a lower sealing member configured to seal between the mounting bushing and the lower casing as the lower fixation nut is fastened to the mounting bushing;

an upper sealing member configured to seal between the mounting bushing and the upper cover as the upper fixation nut is fastened to the mounting bushing; and a vehicle body side sealing member configured to seal between the upper fixation nut and the vehicle body as the coupling bolt is fastened to the vehicle body, wherein the vehicle body side sealing member is mounted on an upper surface of the upper fixation nut, and when the coupling bolt is fastened to a weld nut provided in the vehicle body, the vehicle body side sealing member is compressed between the vehicle body and the upper fixation nut.

7. A vehicle battery pack mounting structure comprising:

a mounting bushing configured to support an interval between a lower casing of a battery pack and an upper cover;

a coupling bolt configured to fix the battery pack to a vehicle body, and coupled to the vehicle body through the mounting bushing so as to generate a pressure to seal between the mounting bushing and the vehicle body;

a lower fixation nut fastened to a lower fixation part of the mounting bushing, the lower fixation part protruding downward through the lower casing, so as to generate a pressure to seal between the mounting bushing and the lower casing; and an upper fixation nut fastened to an upper fixation part of the mounting bushing, the upper fixation part protruding upward through the upper cover, so as to generate a pressure to seal between the mounting bushing and the upper cover, wherein the mounting bushing includes a column part located between the lower casing and the upper cover, and shaped in a hollow cylinder perpendicular to the lower casing and the upper cover, a lower fixation part extending downward from a lower end of the column part and penetrating through the lower casing, and to which the lower fixation nut is fastened, and an upper fixation part extending upward from an upper end of the column part and penetrating through the upper cover, and to which the upper fixation nut is fastened, wherein an upper sealing member is mounted to the upper end of the column part of the mounting bushing and the upper sealing member is compressed between the column part and the upper cover as the upper fixation nut is fastened to the upper fixation part.

8. The vehicle battery pack mounting structure of claim 7, further comprising:

a lower sealing member disposed between the mounting bushing and the lower casing and configured to be deformed by the pressure generated by the lower fixation nut and to provide a sealing function; and a vehicle body side sealing member disposed between the upper fixation nut and the vehicle body and configured to be deformed by the pressure generated by the coupling bolt and to provide the sealing function.

9. The vehicle battery pack mounting structure of claim 7, wherein the mounting bushing comprises a flange part radially protruding from a lower portion of the column part to support an upper surface of the lower casing; and the lower fixation part is configured to accommodate a head part of the coupling bolt therein.

10. The vehicle battery pack mounting structure of claim 9, wherein the lower sealing member is disposed between the flange part of the mounting bushing and the lower casing.

* * * * *